US008226848B2

(12) United States Patent
Dopico et al.

(10) Patent No.: US 8,226,848 B2
(45) Date of Patent: Jul. 24, 2012

(54) METHOD FOR INHIBITING ICE FORMATION AND ACCUMULATION

(75) Inventors: Pablo G. Dopico, Conyers, GA (US); Kurt D. Gabrielson, Lilburn, GA (US); John B. Hines, Atlanta, GA (US); Brian L. Swift, Oxford, GA (US); Dennis L. Kennedy, St. Paul, VA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 0 days.

(21) Appl. No.: 13/240,207

(22) Filed: Sep. 22, 2011

(65) Prior Publication Data

US 2012/0006222 A1  Jan. 12, 2012

Related U.S. Application Data

(62) Division of application No. 12/615,327, filed on Nov. 10, 2009, now Pat. No. 8,048,332.

(60) Provisional application No. 61/113,949, filed on Nov. 12, 2008.

(51) Int. Cl.
*C09K 3/18* (2006.01)
(52) U.S. Cl. ........................... 252/70; 106/13
(58) Field of Classification Search .................. 106/13; 252/70
See application file for complete search history.

(56) References Cited

U.S. PATENT DOCUMENTS

| | | |
|---|---|---|
| 2,101,472 A | 12/1937 | Kormann |
| 2,116,682 A | 5/1938 | Kleinicke et al. |
| 2,373,727 A | 4/1945 | West et al. |
| 2,383,589 A * | 8/1945 | Bunting et al. ............... 428/458 |
| 2,404,431 A * | 7/1946 | Canter et al. .................. 249/115 |
| 2,716,068 A | 8/1955 | Fain et al. |
| 2,730,516 A | 1/1956 | Suen et al. |
| 3,016,719 A * | 1/1962 | Reindl ......................... 249/115 |
| 3,298,804 A | 1/1967 | Schoch et al. |
| 3,624,243 A | 11/1971 | Scott, Jr. et al. |
| 3,794,472 A | 2/1974 | Macaluso et al. |
| 3,870,671 A | 3/1975 | Aignesberger et al. |
| 3,941,734 A | 3/1976 | Aignesberger et al. |
| 4,117,214 A | 9/1978 | Parks et al. |
| 4,225,317 A | 9/1980 | Kugel |
| 4,294,879 A | 10/1981 | McHenry |
| 4,335,155 A | 6/1982 | Blake et al. |
| 4,346,121 A | 8/1982 | Turos |
| 4,403,993 A | 9/1983 | Lach et al. |
| 4,439,337 A | 3/1984 | Nimerick et al. |
| 4,448,702 A | 5/1984 | Kaes |
| 4,501,839 A | 2/1985 | Burge et al. |
| 4,503,081 A | 3/1985 | Ikoma et al. |
| 4,537,204 A | 8/1985 | Gaisch et al. |
| 4,554,005 A | 11/1985 | Hawkins |
| 4,599,102 A | 7/1986 | Hawkins |
| 4,599,250 A | 7/1986 | Cargle et al. |
| 4,666,741 A | 5/1987 | Roe |
| 4,677,159 A | 6/1987 | Lahalih et al. |
| 4,746,449 A | 5/1988 | Peel |
| 4,776,879 A | 10/1988 | Hawkins et al. |
| 4,778,615 A | 10/1988 | Jeglic |
| 4,820,766 A | 4/1989 | Lahalih et al. |
| 4,824,588 A | 4/1989 | Lin |
| 4,839,095 A | 6/1989 | Lahalih et al. |
| 4,839,193 A | 6/1989 | Mange et al. |
| 4,960,531 A | 10/1990 | Connor et al. |
| 5,071,945 A | 12/1991 | Weichmann et al. |
| 5,424,390 A | 6/1995 | Dupuis et al. |
| 5,429,763 A | 7/1995 | Dieupart |
| 5,670,567 A | 9/1997 | Lahalih |
| 5,710,239 A | 1/1998 | Tutin |
| 5,876,621 A | 3/1999 | Sapienza |
| 5,891,225 A | 4/1999 | Mishra et al. |
| 5,980,774 A | 11/1999 | Sapienza |
| 6,114,491 A | 9/2000 | Dupre et al. |
| 6,149,834 A | 11/2000 | Gall et al. |
| 6,183,664 B1 | 2/2001 | Kim et al. |
| 6,245,438 B1 | 6/2001 | Dupre et al. |
| 6,306,194 B1 | 10/2001 | Wertz et al. |
| 6,369,171 B2 | 4/2002 | Dupre et al. |
| 6,379,814 B1 | 4/2002 | Dupre et al. |
| 6,506,318 B1 | 1/2003 | Sapienza et al. |
| 6,586,557 B2 | 7/2003 | Taylor |
| 6,632,262 B2 | 10/2003 | Gabrielson |
| 6,864,344 B1 | 3/2005 | Holland et al. |
| 6,878,308 B2 | 4/2005 | Schilling |
| 7,285,331 B1 | 10/2007 | Reihs et al. |
| 8,048,332 B2 | 11/2011 | Dopico et al. |
| 2007/0194272 A1 | 8/2007 | Sapienza |
| 2009/0301972 A1 | 12/2009 | Hines et al. |

FOREIGN PATENT DOCUMENTS

FR  2852966 A  10/2004

OTHER PUBLICATIONS

Chemical Abstract No. 107:99485, abstract of an article by Nowak, Dominik et al entitled "Methoxylated urea-formaldehyde condensate as an antifreezing liquid for bituminous coal" Przemysl Chemiczny (1987), 66(2), pp. 96-98.*
Ames, Jennifer M., "The Maillard Browning Reaction—an Update", Chemistry and Industry, Sep. 5, 1988, Issue No. 1, London, Great Britain.
Kaminski, Eva, Isolation and Identification of Novolatile Water Solube Maillard Reaction Products, Thesis, 1997, p. 13, McGill University, Montreal, Canada.
International Search Report and Written Opinion of the International Searching Authority for PCT/US09/63778 mailed Feb. 28, 2010.

* cited by examiner

*Primary Examiner* — Anthony J Green
(74) *Attorney, Agent, or Firm* — Ram W. Sabnis

(57) ABSTRACT

The present invention relates to a method for inhibiting the formation or accumulation of ice on a solid surface and for reducing the salt out temperatures.

3 Claims, No Drawings

METHOD FOR INHIBITING ICE FORMATION AND ACCUMULATION

CROSS-REFERENCE TO RELATED APPLICATIONS

This application claims priority to and is a division of U.S. patent application Ser. No. 12/615,327, filed Nov. 10, 2009, now U.S. Pat. No. 8,048,332, which claims priority to and is the non-provisional of U.S. patent application Ser. No. 61/113,949, filed on Nov. 12, 2008, the entireties of each are incorporated herein by reference.

FIELD OF THE INVENTION

The present invention relates to a method for inhibiting the formation or accumulation of ice, particularly on a surface, which is applicable to a wide variety of applications. The present invention broadly relates to the use of certain freeze conditioning agents in anti-icing, deicing, or low temperature salt out prevention applications.

BACKGROUND OF THE INVENTION

Removing or inhibiting the formation of ice is an activity that can be useful, or necessary in a wide array of circumstances.

For example, the formation of ice from moisture present in a mass of particulate material, such as coal or coke, has long been a troublesome problem confronting the collection, storage, transportation and use of such particulate material. As moisture present with the particulate solids freezes, the ice that is formed acts as a strong adhesive contributing to the formation of coherent masses of particles. The so-formed masses significantly interfere with attempts to process the particulates through normal solid handling techniques.

Other instances where the formation or accumulation of ice creates problems include the formation or accumulation of ice on roads and other outdoor surfaces, such as sidewalks, parking lots, driveways and the like; the formation or accumulation of ice on exposed surfaces of airplanes, on airport runways and the like, the formation or accumulation of ice on plants, on fruits and on vegetables to name but a few potential deicing or anti-icing applications.

The prior art has proposed a variety of compositions, alternatively referred to as freeze conditioners (freeze conditioning compositions or agents), de-icing compositions or agents, anti-icing compositions or agents, low temperature salt out prevention agents, and freeze control compositions or agents, that can be used in such applications to inhibit the formation and/or remove the accumulation of ice. These materials work by reducing or depressing the freezing point of water, (or other dissolved solids in salt out applications) and by interfering with the formation of coherent ice crystals (e.g., inhibiting or terminating ice crystal growth), so that the frozen water is physically weak and more easily fractured. In this regard, we refer the reader to the following non-exhaustive list of U.S. Patents describing a wide variety of freeze conditioners: U.S. Pat. Nos. 2,101,472; 2,116,682; 2,373,727; 2,716,068; 3,298,804; 3,624,243; 3,794,472; 4,117,214; 4,225,317; 4,439,337; 4,448,702; 4,599,250; 4,666,741; 4,746,449; 4,778,615; 4,824,588; 4,960,531; 5,429,763; 5,876,621; 5,891,225; 5,980,774; 6,149,834; 6,183,664; 6,506,318 and 6,878,308.

Because no one composition has been universally accepted and because such compositions generally suffer from one or more negative attributes, such as high cost, unacceptable corrosion, limited effectiveness and the like, which limits their utility across the wide variety of potential de-icing and anti-icing applications, the prior art continues to explore the suitability of alternative compositions for deicing and anti-icing applications.

In certain cases, like in the freeze conditioning of combustible materials such as coal, coke and grain, it is desirable that the freeze conditioner also protect the combustible materials from premature combustion. The freeze conditioning and deicing materials of the present invention and materials similar to those described in the present invention have demonstrated, in other applications, the ability to protect the substrate onto which they are applied from combustion as described in the following U.S. Pat. Nos. 4,294,879; 5,710,239; 6,114,491; 6,245,438; 6,369,171; 6,379,814; 6,586,557.

SUMMARY OF THE INVENTION

In one embodiment, the present invention is directed to a method for inhibiting the formation or accumulation of ice on a surface which comprises treating the surface with a freeze conditioner selected from the group consisting of (1) urea-formaldehyde, particularly including those containing triazone(s) (2) sulfonated melamine-formaldehyde, (3) methylated melamine-formaldehyde, (4) sulfonated urea-formaldehyde, (5) sulfonated urea-melamine formaldehyde, (6) Maillard reaction products of an amine reactant and a reducing sugar, a reducing sugar equivalent, or a mixture thereof, and their blends.

In one embodiment, the present invention is directed to a method of treating moist particulate solids to inhibit formation of a coherent mass of the particulate solids under freezing conditions which comprises applying a freeze conditioner selected from the group consisting of (1) urea-formaldehyde, particularly including those containing triazone(s) (2) sulfonated melamine-formaldehyde, (3) methylated melamine-formaldehyde, (4) sulfonated urea-formaldehyde, (5) sulfonated urea-melamine formaldehyde, (6) Maillard reaction products of an amine reactant and a reducing sugar, a reducing sugar equivalent, or a mixture thereof, and their blends to the particulate solids.

In one embodiment, the present invention is directed to a method of treating moist particulate combustible solids, such as coal, coke, or grain, to inhibit formation of a coherent mass of the particulate solids under freezing conditions while also inhibiting the potential for such solids to undergo combustion, which comprises applying a freeze conditioner selected from the group consisting of (1) urea-formaldehyde, particularly including those containing triazone(s) (2) sulfonated melamine-formaldehyde, (3) methylated melamine-formaldehyde, (4) sulfonated urea-formaldehyde, (5) sulfonated urea-melamine formaldehyde, (6) Maillard reaction products of an amine reactant and a reducing sugar, a reducing sugar equivalent, or a mixture thereof, and their blends to the particulate solids.

In one embodiment, the present invention is directed to a method for treating outdoor surfaces to interfere with the formation, or accumulation of ice on the surface which comprises applying to the surface a freeze conditioner selected from the group consisting of (1) urea-formaldehyde, particularly including those containing triazone(s) (2) sulfonated melamine-formaldehyde, (3) methylated melamine-formaldehyde, (4) sulfonated urea-formaldehyde, (5) sulfonated urea-melamine formaldehyde, (6) Maillard reaction products of an amine reactant and a reducing sugar, a reducing sugar equivalent, or a mixture thereof, and their blends.

In one embodiment, the present invention is directed to a method for deicing aircraft which comprises spraying an aqueous solution of a freeze conditioner selected from the group consisting of (1) urea-formaldehyde, particularly including those containing triazone(s) (2) sulfonated melamine-formaldehyde, (3) methylated melamine-formaldehyde, (4) sulfonated urea-formaldehyde, (5) sulfonated urea-melamine formaldehyde, (6) Maillard reaction products of an amine reactant and a reducing sugar, a reducing sugar equivalent, or a mixture thereof, and their blends onto the surface of the aircraft.

In one embodiment, the present invention is directed to a method for lowering the salt-out temperature of liquid fertilizers, including aqueous solutions of urea, ammonium nitrate, calcium nitrate, magnesium nitrate, calcium ammonium nitrate, diammonium phosphate, dipotassium phosphate, disodium phosphate, ammonium potassium phosphate, ammonium sodium phosphate, ammonium sulfate, potassium sulfate, ammonium potassium sulfate, ammonium sodium sulfate, potassium sodium sulfate and mixtures thereof. In particular, the method comprises adding a freeze conditioner composition selected from the group consisting of (1) urea-formaldehyde, particularly including those containing triazone(s) (2) sulfonated melamine-formaldehyde, (3) methylated melamine-formaldehyde, (4) sulfonated urea-formaldehyde, (5) sulfonated urea-melamine formaldehyde, (6) Maillard reaction products of an amine reactant and a reducing sugar, a reducing sugar equivalent, or a mixture thereof, and their blends to a liquid fertilizer. The addition of urea-formaldehyde, including those containing triazone(s), or the addition of sulfonated urea-formaldehyde to a fertilizer solution can significantly lower the salt-out temperature of such liquid fertilizers.

In one embodiment, the present invention is directed to a method for reducing the salt out temperature of a liquid deicing solution, such as an aqueous solution of ammonium formate, sodium formate, potassium formate, ammonium chloride, sodium chloride, potassium chloride, calcium chloride, magnesium chloride, ammonium acetate, sodium acetate, potassium acetate, calcium magnesium acetate, boric acid, borate salts; sugars, such as sorbitol, molasses solids and sugar beet derivatives; and other simple organics like urea and mixtures thereof, which comprises adding to the liquid deicing solution an aqueous solution of a freeze conditioner selected from the group consisting of (1) urea-formaldehyde, (2) sulfonated melamine-formaldehyde, (3) methylated melamine-formaldehyde, (4) sulfonated urea-formaldehyde, (5) sulfonated urea-melamine formaldehyde, (6) Maillard reaction products of an amine reactant and a reducing sugar, a reducing sugar equivalent, or a mixture thereof, and their blends.

DETAILED DESCRIPTION OF THE INVENTION

In one aspect, the present invention is directed to alternative approaches for inhibiting the formation and/or accumulation of ice on a surface, i.e., for de-icing surfaces or for anti-icing treatment of a surface. The present invention has particular utility in the treatment of moisture-containing particulate solids, particularly combustible solids such as coal, coke or grain, to inhibit the agglomeration of such particulate solids into a coherent mass that normally accompanies exposing such solids to freezing conditions. Treating such moisture-containing particulate solids with certain freeze conditioners reduces the cohesive strength of such solids when frozen and in the case of combustible solids, also reduces their tendency to combust prematurely.

In another aspect, the present invention also is directed to alternative approaches for reducing the salt out temperature of liquid fertilizers, such as aqueous solutions of urea, ammonium nitrate, calcium nitrate, magnesium nitrate, calcium ammonium nitrate, diammonium phosphate, dipotassium phosphate, disodium phosphate, ammonium potassium phosphate, ammonium sodium phosphate, ammonium sulfate, potassium sulfate, ammonium potassium sulfate, ammonium sodium sulfate, potassium sodium sulfate and mixtures thereof.

In another aspect, the present invention is directed to a method for reducing the salt out temperature of a liquid deicing solution, such as an aqueous solution of ammonium formate, sodium formate, potassium formate, ammonium chloride, sodium chloride, potassium chloride, calcium chloride, magnesium chloride, ammonium acetate, sodium acetate, potassium acetate, calcium magnesium acetate, boric acid, borate salts; sugars, such as sorbitol, molasses solids and sugar beet derivatives; and other simple organics like urea and mixtures thereof.

The present invention is based on applicants' recognition that certain compositions can satisfactorily act as freeze conditioners in a wide variety of deicing, anti-icing and salt-out applications and for a wide variety of materials or surfaces.

The various freeze conditioner compositions of the present invention can broadly be applied to a surface, or to a solution for salting out prevention, either as a liquid or as a solid, though it is expected that one convenient approach, most suitable for many of the available applications, will be to apply the composition as an aqueous solution. Nonetheless, in applications where investments may have been made on equipment designed to apply solid freeze conditioning agents, the present invention also contemplates applying the freeze conditioner compositions of the present invention as a particulate solid. Such solid freeze conditioners may be made by removing water in connection with the preparation of aqueous freeze conditioner compositions through the intervention of spray drying, freeze drying, or any other suitable technique.

While a single treatment of a surface or solution, with a freeze conditioner of the present invention may be sufficient in many instances, the method contemplates instances where repeated applications of the freeze conditioner is advantageous.

As a result, the amount of freeze conditioner (alternatively known as deicing agent, or anti-icing agent) that is present in a composition destined to be used in accordance with a method of the present invention, such as in the application of the composition directly to a surface on which the formation or accumulation of ice is to be inhibited, the application of the composition directly to a quantity of particulate solids on which the formation or accumulation of ice is to be inhibited, or the addition of the composition to a liquid fertilizer or to a deicing solution, can, depending on the particular application of use, vary over a wide range from 0.1 to 100 weight percent. In the case of aqueous solutions of the freeze conditioner, the freeze conditioner may be present in the composition destined to be added to a fertilizer or deicing solution, or applied directly to a surface, including onto a quantity of particulate solids, on which the formation or accumulation of ice is to be inhibited, such as in an amount of from 1 to 98 weight percent, such as in an amount of 10 to 90 weight percent, such as in an amount of 10 to 80 weight percent, such as in an amount of 20 to 70 weight percent. Often, the freeze conditioner will be present in the aqueous freeze conditioner composition in an amount of at least 25 weight percent.

While the invention is broadly directed to a method for inhibiting the formation or accumulation of ice on a surface, or to a method for inhibiting the salting out that occurs in certain aqueous solutions, through the use of certain freeze conditioners, the invention is particularly well adapted for the treatment of moisture-containing particulate solids, especially combustible solids, to inhibit or interfere with formation of a coherent mass of the particulate solids under freezing conditions. Particulate materials that particularly benefit from treatment in accordance with one embodiment of the present invention include grains, coal, coke, sand, gravel, and mineral ores such as iron ore, nickel ore, lead ore, zinc ore, bauxite, feldspar, bentonite, kaolin, titanium ore, tin ore, potash, phosphate ore, oil sands and copper ore to name a few. Particulate solids of these materials are often stored or transported in a way that exposes the material to the elements (e.g., rain and snow) allowing them to collect significant amounts of surface moisture. Under freezing conditions these solids form coherent masses of particles that are very hard to breakup. Treating the solids with the particular freeze conditioners employed by the present invention reduces the cohesive strength of any masses that may form under freezing conditions, thus lowering the crush strength of the frozen solids. Usually, in such applications, the freeze conditioners of the present invention will be applied to the particulate solids as an aqueous solution, so as to provide from 0.001 part by weight to 0.05 part by weight of the freeze conditioner per part by weight of the particulate material to be freeze conditioned, usually from 0.0025 part by weight to 0.025 part by weight of the freeze conditioner per part by weight, and possibly from 0.003 to 0.01 of the particulate material to be freeze conditioned.

As noted above, the freeze conditioners of the present invention are selected from the group consisting of (1) urea-formaldehyde, particularly including those containing triazone(s) (2) sulfonated melamine-formaldehyde, (3) methylated melamine-formaldehyde, (4) sulfonated urea-formaldehyde, (5) sulfonated urea-melamine formaldehyde, (6) Maillard reaction products of an amine reactant and a reducing sugar, a reducing sugar equivalent, or a mixture thereof, and their blends.

Aqueous urea-formaldehyde compositions, particularly those containing water soluble triazones are known to be useful as controlled release fertilizers. Methods for making urea-formaldehyde compositions by reacting urea and formaldehyde over a wide range of conditions, particularly those that are water soluble, are well known and such compositions are widely available commercially. Georgia-Pacific Chemicals LLC is one such supplier. Triazone-containing urea-formaldehyde compositions, in particular, are prepared by co-reacting urea, formaldehyde and ammonia (or another primary amine) in selected ratios. Compounds having a heterocyclic structure resulting from the reaction of these three components are known as triazones.

For example, several patents, issued to Hawkins, describe the preparation of urea-formaldehyde adducts having high triazone contents. U.S. Pat. No. 4,554,005 describes a reaction that is thought to produce an aqueous solution containing at least about 30% by weight triazones and is prepared at a preferred urea, formaldehyde, ammonia ratio of 1.2/1.0/0.28. U.S. Pat. No. 4,599,102 describes a reaction that is also thought to produce an aqueous solution containing at least about 30% by weight triazones, prepared at a urea, formaldehyde, ammonia ratio of 1.2/1.0/0.5. U.S. Pat. No. 4,776,879 describes a reaction at a urea, formaldehyde, ammonia ratio of 0.5/1.0/0.5 that is said to produce at least about 75% by weight triazones in water insoluble forms. The triazones are crystallized from the reaction products. Hawkins describes redissolving the triazone solids in water at a low solids level for use as a fertilizer. U.S. Pat. No. 4,778,510 describes a reaction at a urea, formaldehyde, ammonia ratio of 0.9/1.0/0.3 that is said to produce an aqueous solution containing at least about 48% triazone.

Other patents describing the reaction among urea, formaldehyde and ammonia (and/or a primary amine) at other ratios for making triazone-containing compositions, possibly at somewhat lower triazone contents, include U.S. Pat. No. 6,114,491, U.S. Pat. No. 6,306,194, U.S. Pat. No. 6,586,557 and U.S. Pat. No. 6,632,262.

In order not to burden this application with a description of the method of making these known compositions, applicants hereby incorporate by reference the processes for making the urea-formaldehyde triazone-containing compositions described in each of the patents mentioned in the previous two paragraphs. Thus, suitable urea-formaldehyde compositions are prepared by reacting urea (U), formaldehyde (F) and ammonia and/or a primary amine (A) over a wide range of relative mole ratios. Urea-formaldehyde formulations made at U/F/A mole ratios in the range of 0.5-2.0/0.5-5.0/0.0-1.0 are contemplated. Triazone-containing urea-formaldehyde formulations made at U/F/A mole ratios in the range of 1.0/0.5-5.0/0.3-1.0 are contemplated. Particular triazone-containing urea-formaldehyde formulations can be made at U/F/A mole ratios in the range of 1/4.0-5.0/0.5-0.6; 1/0.6-1.0/0.25-0.35; 1/1-1.3/0.2-0.4; 1/1-4/0.5-1.0; and 1/2.0-3.0/0.75-1.0 In any event, in its broadest aspects, the present invention is not limited to the use of any one of these patents or ratios and it is contemplated that any urea-formaldehyde formulation, including those containing at least 1 weight percent triazone, should be suitable for preparing a freeze conditioner composition useful in accordance with certain aspects of the method of the present invention.

Depending upon any particular de-icing, anti-icing or salt-out prevention application, the aforementioned urea formaldehyde formulations, including triazone-containing formulations, produced in accordance with prior art teachings, may be used directly without any modification as a freeze conditioner composition in the practice of the present invention. Alternatively, converting the so-described urea-formaldehyde formulations, including triazone-containing formulations into a freeze conditioner composition may be as simple as diluting the aqueous reaction products with additional water to lower the urea-formaldehyde content to the desired target for the particular deicing, anti-icing, or salt out prevention application.

The amount of urea-formaldehyde (including those containing triazone(s)) freeze conditioner composition to apply to a surface, or to a quantity of particulate solids to be treated depends upon the particular application and the anticipated moisture content. For example, when used for treating particulate solids, such as grains, coal or coke, for inhibiting agglomeration under freezing conditions, where the moisture content of such solids is expected to be above 5% by weight and often in the range of about 5 to 20% by weight, it is contemplated that an amount of the composition should be applied such that at least about 0.001 part by weight to 0.05 part by weight of the freeze conditioner per part by weight of the particulate material to be freeze conditioned, usually from 0.0025 part by weight to 0.025 part by weight of the freeze conditioner per part by weight, and possibly from 0.003 to 0.01 of the particulate material to be freeze conditioned is applied. For other applications, such as for deicing roads, or for deicing, or anti-icing other outdoor surfaces, such as for deicing airplanes, the urea-formaldehyde composition, particularly those containing triazone(s), should be applied such that at least about 1 and up to about 35 pounds, often from about 2 up to about 25 pounds, also from about 3 up to about 16 pounds, of a suitable urea-formaldehyde composition is deposited over each 100 square feet of surface to be treated for deicing or anti-icing. A suitable application rate for other potential uses of the urea-formaldehyde freeze conditioner, such as to inhibit or prevent ice formation on plants, on fruits and on vegetables can be determined by an ordinary skilled worker using only routine experimentation.

It is also contemplated that the urea-formaldehyde composition, particularly those containing triazone(s), could be augmented with or used to augment other components that have historically been used in deicing and anti-icing compositions such as inorganic salts, ethylene glycol, diethylene glycol, propylene glycol, glycerol, acetate salts, formate salts, alcohols, sugars, including molasses, borate salts, urea, surfactants, and the like.

To reduce the salt out temperature of (1) liquid fertilizers, such as aqueous solutions of urea, ammonium nitrate, calcium nitrate, magnesium nitrate, calcium ammonium nitrate, diammonium phosphate, dipotassium phosphate, disodium phosphate, ammonium potassium phosphate, ammonium sodium phosphate, ammonium sulfate, potassium sulfate, ammonium potassium sulfate, ammonium sodium sulfate, potassium sodium sulfate and mixtures thereof, or (2) deicing solutions, such as such as aqueous solutions of ammonium formate, sodium formate, potassium formate, ammonium chloride, sodium chloride, potassium chloride, calcium chloride, magnesium chloride, ammonium acetate, sodium acetate, potassium acetate, calcium magnesium acetate, boric acid, borate salts; sugars like sorbitol, molasses solids and sugar beet derivatives; and other simple organics like urea and mixtures thereof, an amount of the urea-formaldehyde freeze conditioner composition (including those containing triazone(s)) is added to the liquid fertilizer or to the deicing solution so as to provide at least 2 and up to 50 percent by weight, alternatively at least 5 percent by weight, alternatively at least 10 percent by weight up to 50 percent by weight, alternatively up to 40 percent by weight, alternatively up to 30 percent by weight, of the urea-formaldehyde composition in the liquid fertilizer or deicing solution.

Use of the urea-formaldehyde composition, particularly those containing triazone(s) to reduce the salt out temperature of liquid fertilizer solutions, including mixtures with aqueous nitrates such as with UAN (28-0-0), UAN (30-0-0), UAN (32-0-0), calcium ammonium nitrate (CAN-17), calcium nitrate, and magnesium nitrate, are particularly contemplated.

Aqueous compositions containing water soluble sulfonated melamine-formaldehyde adducts (including water soluble sulfonated melamine-urea-formaldehyde adducts) are known to be useful, inter alia, as binders for fiberglass insulation products and as dispersing agents for a variety of applications. Similarly, methylated melamine-formaldehyde adducts are known to be useful in similar applications.

Such sulfonated melamine-formaldehyde compositions, including sulfonated melamine-urea-formaldehyde adducts, can be prepared by co-reacting melamine, formaldehyde and a sulfonating agent such as sodium sulfite, sodium bisulfite, fuming sulfuric acid, or sulfonic acid in selected ratios. Generally, a melamine (or melamine plus urea) (M) to formaldehyde (F) mole ratio (M/F) in the range of 1/1 to 1/6, or in the range of 1/2 to 1/4, or in the range of 1/1.5 to 1/3.0 can be used. Melamine (or melamine plus urea) (M) to sulfonating agent (S) mole ratios (M/S) in the range of 1/0.3 to 1/2, or in the range of 1/0.5 to 1/1.5, or in the range of 1/0.8 to 1/1.2 can be used.

Methylated melamine-formaldehyde compositions can be prepared by co-reacting melamine, formaldehyde and methanol. For example, a melamine-formaldehyde resin is reacted (methylated) with methanol which etherifies the methylol groups of the melamine-formaldehyde adduct to form methoxymethyl groups. The degree of methylation of the melamine-formaldehyde resin is controlled by adjusting the amount of methanol used in this reaction. Methylated melamine-formaldehyde resins are available commercially. Cymel 350 is an example of a resin having a relatively high degree of methylation while maintaining complete water solubility. Cymel 350 is available from Cytec Industries.

Processes for making suitable water soluble sulfonated melamine-formaldehyde adducts and sulfonated melamine-urea-formaldehyde adducts for use in connection with the method of the present invention are described in the prior art. For example, suitable processes are described, inter cilia, in U.S. Pat. Nos. 2,730,516; 3,870,671; 3,941,734; 4,403,993; 4,501,839; 4,677,159; 4,820,766; 5,071,945; 5,424,390, 5,670,567, 5,710,239 and 6,864,344. In order not to unnecessarily burden this application, applicants hereby incorporate by reference the various processes for making the sulfonated melamine-formaldehyde-containing compositions and the sulfonated melamine-urea-formaldehyde-containing compositions described in each of the aforementioned patents.

In any event, the present invention is not limited to the use of any one of these patents and it is contemplated that that any formulation containing at least 1 weight percent of sulfonated melamine-formaldehyde adduct, sulfonated melamine-urea-formaldehyde adduct and/or methylated melamine-formaldehyde adduct should be suitable for preparing a freezing conditioner composition useful in accordance with certain aspects of the method of the present invention.

Depending upon any particular de-icing or anti-icing application, the aforementioned sulfonated melamine-formaldehyde-containing compositions, sulfonated melamine-urea-formaldehyde-containing compositions and/or methylated melamine-formaldehyde-containing compositions produced in accordance with these prior art teachings may be used directly without any modification as a freeze conditioner composition in the practice of the present invention. Alternatively, converting the so-described sulfonated melamine-formaldehyde-containing compositions, sulfonated melamine-urea-formaldehyde-containing compositions and/or methylated melamine-formaldehyde-containing compositions into a freeze conditioner composition may be as simple as diluting the aqueous reaction products with additional water to lower the sulfonated melamine-formaldehyde content, the sulfonated melamine-ure-formaldehyde content and or the methylated melamine-formaldehyde content to the desired target for the particular deicing or anti-icing application.

As is the case with the urea-formaldehyde freeze conditioner described above, the amount of sulfonated melamine-formaldehyde-containing freeze conditioner composition, sulfonated melamine-urea-formaldehyde freeze conditioner composition and/or methylated melamine-formaldehyde freeze conditioner composition to apply to a surface to be treated also depends upon the particular application and the anticipated moisture content. For example, when used for treating particulate solids, such as grains, coal or coke, for inhibiting agglomeration under freezing conditions, where the moisture content of such solids is expected to be above 5% by weight and often in the range of about 5 to 20% by weight, it is contemplated that an amount of the composition should be applied such that at least about 0.001 part by weight to 0.05 part by weight of the freeze conditioner per part by weight of the particulate material to be freeze conditioned, usually from 0.0025 part by weight to 0.025 part by weight of the freeze conditioner per part by weight, and possibly from 0.003 to 0.01 of the particulate material to be freeze conditioned is applied. For other applications, such as for deicing roads, or for deicing, or anti-icing other outdoor surfaces, such as for deicing airplanes, the sulfonated melamine-formaldehyde-containing freeze conditioner composition, sulfonated melamine-urea-formaldehyde freeze conditioner composition and/or methylated melamine-formaldehyde freeze conditioner composition should be applied such that at least about 1 and up to about 35 pounds, often from about 2 up to about 25 pounds, also from about 3 up to about 16 pounds of sulfonated melamine-formaldehyde composition, sulfonated melamine-urea-formaldehyde composition and/or methylated melamine-formaldehyde composition is deposited over each 100 square feet of surface to be treated for deicing or anti-icing. A suitable application rate for other potential uses of the sulfonated melamine-formaldehyde-containing freeze conditioner composition, sulfonated melamine-urea-formaldehyde freeze conditioner composition and/or methylated melamine-formaldehyde freeze conditioner composition, such as to inhibit or prevent ice formation on plants, on fruits and on vegetables can be determined by an ordinary skilled worker using only routine experimentation.

It is also contemplated that the sulfonated melamine-formaldehyde-containing freeze conditioner composition, sulfonated melamine-urea-formaldehyde freeze conditioner composition and/or methylated melamine-formaldehyde freeze conditioner composition could be augmented with, or used to augment other components that have historically been used in deicing and anti-icing compositions such as inorganic salts, ethylene glycol, diethylene glycol, propylene glycol, glycerol, acetate salts, formate salts, alcohols, sugars, including molasses, borate salts, urea, surfactants, and the like.

To reduce the salt out temperature of (1) liquid fertilizers, such as aqueous solutions of urea, ammonium nitrate, calcium nitrate, magnesium nitrate, calcium ammonium nitrate, diammonium phosphate, dipotassium phosphate, disodium phosphate, ammonium potassium phosphate, ammonium sodium phosphate, ammonium sulfate, potassium sulfate, ammonium potassium sulfate, ammonium sodium sulfate, potassium sodium sulfate and mixtures thereof, or (2) deicing solutions, such as such as aqueous solutions of ammonium formate, sodium formate, potassium formate, ammonium chloride, sodium chloride, potassium chloride, calcium chloride, magnesium chloride, ammonium acetate, sodium acetate, potassium acetate, calcium magnesium acetate, boric acid, borate salts; sugars like sorbitol, molasses solids and sugar beet derivatives; and other simple organics like urea and mixtures thereof, an amount of sulfonated melamine-urea-formaldehyde freeze conditioner composition and/or methylated melamine-formaldehyde freeze conditioner composition is added to the liquid fertilizer or to the deicing solution so as to provide at least 2 and up to 50 percent by weight, alternatively at least 5 percent by weight, alternatively at least 10 percent by weight up to 50 percent by weight, alternatively up to 40 percent by weight, alternatively up to 30 percent by weight, of sulfonated melamine-urea-formaldehyde and/or methylated melamine-formaldehyde in the liquid fertilizer or deicing solution.

Use of sulfonated melamine-urea-formaldehyde and/or methylated melamine-formaldehyde to reduce the salt out temperature of liquid fertilizer solutions, including mixtures with aqueous nitrates such as with UAN (28-0-0), UAN (30-0-0), UAN (32-0-0), calcium ammonium nitrate (CAN-17), calcium nitrate, and magnesium nitrate, are particularly contemplated.

Aqueous compositions containing water soluble sulfonated urea-formaldehyde adducts are known to be useful, inter alia, as a dispersing agent for drilling mud. Such compositions can be prepared by co-reacting urea, formaldehyde and a sulfonating agent, such as sodium sulfite, sodium bisulfite, fuming sulfuric acid, or sulfonic acid, e.g., by sulfonating urea-formaldehyde.

Processes for making suitable water soluble sulfonated urea-formaldehyde adducts for use in connection with the method of the present invention are described in the prior art. For example, a suitable process is described in U.S. Pat. No. 4,839,095, which is hereby incorporated by reference.

In any event, the present invention is not limited to the use of any particular process for making a sulfonated urea-formaldehyde composition and it is contemplated that any formulation containing at least 1 weight percent of a sulfonated urea-formaldehyde adduct should be suitable for preparing a freezing conditioner composition useful in accordance with certain aspects of the method of the present invention.

Depending upon any particular de-icing or anti-icing application, the aforementioned sulfonated urea-formaldehyde-containing compositions produced in accordance with the prior art may be used directly without any modification as a freeze conditioner composition in the practice of the present invention. Alternatively, converting the so-described sulfonated urea-formaldehyde-containing formulations into a freeze conditioner composition may be as simple as diluting the aqueous reaction products with additional water to lower the sulfonated urea-formaldehyde content to the desired target for the particular deicing or anti-icing application.

As is the case with the urea-formaldehyde freeze conditioner described above, the amount of sulfonated urea-formaldehyde-containing freeze conditioner composition to apply to a surface to be treated also depends upon the particular application and the anticipated moisture content. For example, when used for treating particulate solids, such as grains, coal or coke, for inhibiting agglomeration under freezing conditions, where the moisture content of such solids is expected to be above 5% by weight and often in the range of about 5 to 20% by weight, it is contemplated that an amount of the composition should be applied such that at least about 0.001 part by weight to 0.05 part by weight of the freeze conditioner per part by weight of the particulate material to be freeze conditioned, usually from 0.0025 part by weight to 0.025 part by weight of the freeze conditioner per part by weight, and possibly from 0.003 to 0.01 of the particulate material to be freeze conditioned is applied. For other applications, such as for deicing roads, or for deicing, or anti-icing other outdoor surfaces, such as for deicing airplanes, the sulfonated urea-formaldehyde-containing freeze conditioner composition should be applied such that at least about 1 and up to about 35 pounds, often from about 2 up to about 25 pounds, also from about 3 up to about 16 pounds of sulfonated urea-formaldehyde composition is deposited over each 100 square feet of surface to be treated for deicing or anti-icing. A suitable application rate for other potential uses of the sulfonated urea-formaldehyde freeze conditioner composition, such as to inhibit or prevent ice formation on plants, on fruits and on vegetables can be determined by an ordinary skilled worker using only routine experimentation.

It is also contemplated that the sulfonated urea-formaldehyde-containing composition could be augmented with or could be used to augment other components that have historically been used in deicing and anti-icing compositions such as inorganic salts, ethylene glycol, diethylene glycol, propylene glycol, glycerol, acetate salts, formate salts, alcohols, sugars, including molasses, borate salts, urea, surfactants, and the like.

To reduce the salt out temperature of (1) liquid fertilizers, such as aqueous solutions of urea, ammonium nitrate, calcium nitrate, magnesium nitrate, calcium ammonium nitrate, diammonium phosphate, dipotassium phosphate, disodium phosphate, ammonium potassium phosphate, ammonium sodium phosphate, ammonium sulfate, potassium sulfate, ammonium potassium sulfate, ammonium sodium sulfate, potassium sodium sulfate and mixtures thereof, or (2) deicing solutions, such as such as aqueous solutions of ammonium formate, sodium formate, potassium formate, ammonium chloride, sodium chloride, potassium chloride, calcium chloride, magnesium chloride, ammonium acetate, sodium acetate, potassium acetate, calcium magnesium acetate, boric acid, borate salts; sugars like sorbitol, molasses solids and sugar beet derivatives; and other simple organics like urea and mixtures thereof, an amount of sulfonated urea-formaldehyde-containing freeze conditioner composition is added to the liquid fertilizer or to the deicing solution so as to provide at least 2 and up to 50 percent by weight, alternatively at least 5 percent by weight, alternatively at least 10 percent by weight up to 50 percent by weight, alternatively up to 40 percent by weight, alternatively up to 30 percent by weight, sulfonated urea-formaldehyde in the liquid fertilizer or deicing solution.

Use of sulfonated urea-formaldehyde to reduce the salt out temperature of liquid fertilizer solutions, including mixtures with aqueous nitrates such as with UAN (28-0-0), UAN (30-0-0), UAN (32-0-0), calcium ammonium nitrate (CAN-17), calcium nitrate, and magnesium nitrate, are particularly contemplated.

Maillard reaction products, comprising adducts of (1) an amine reactant and (2) a reducing sugar, a reducing sugar equivalent, or a mixture thereof are known to be useful, inter alia, as flavor enhancements for foods and other products as described in U.S. Pat. Nos. 4,335,155; 4,346,121; 4,503,081; 4,537,204; and 4,839,193. In its normal usage, a Maillard reaction is a chemical reaction between an amino acid (one category of an amine reactant) and a reducing sugar that often requires added heat to promote the reaction. It is known to involve a non-enzymatic browning where a reactive carbonyl group of the reducing sugar reacts with the nucleophilic amino group of the amino acid. The resulting products (hereinafter referred to as simply "the Maillard reaction product") include a wide variety of poorly characterized molecular species, including certain high molecular weight heterogeneous polymers, generally identified as melanoidins.

A Maillard reaction product is prepared by a reaction between (1) an amine reactant and (2) a reducing sugar, a reducing sugar equivalent, or a mixture thereof.

Broadly, amine reactants suitable for forming a Maillard reaction product used as a freeze conditioner in accordance with the present invention include almost any compound that has one or more reactive amino groups, i.e., an amino group available for reaction with a reducing sugar, a reducing sugar equivalent, or a mixture thereof. Compounds which have (or which function as though they have) more than one reactive amino group provide more flexibility in the synthesis of useful Maillard reaction products. Suitable reactive amino groups can be classified as a primary amino groups (i.e., —$NH_2$) and secondary amino groups (i.e., —NHR), where R can be any moiety that does not interfere with the Maillard reaction.

Amine reactants thus include ammonia, hydrazine, guanidine, primary amines (e.g., compounds generally having the formula $NH_2R^1$), secondary amines (e.g., compounds generally having the formula $NHR^1R^2$), quaternary ammonium compounds (e.g., compounds generally having a group of the formula $(NH_4)^+$, $(NH_3R^1)^+$ and $(NH_2R^1R^2)^+$ and a related anion), polyamines (compounds having multiple primary and/or secondary nitrogen moieties (i.e., reactive amino groups) not strictly embraced by the foregoing formulae), amino acids, and proteins, where $R^1$ and $R^2$ in the amines and quaternary ammonium compounds are each selected (independently in the case of $(NHR^1R^2)$ and $(NH_2R^1R^2)^+$) from hydroxyl, alkyl, alkenyl, alkynyl, cycloalkyl, aryl, heterocyclic, and heteroaryl groups (as defined hereinafter).

"Alkyl" (monovalent) when used alone or as part of another term (e.g., alkoxy) means an optionally substituted branched or unbranched, saturated aliphatic hydrocarbon group, having up to 25 carbon atoms unless otherwise specified. Examples of particular unsubstituted alkyl groups include, but are not limited to, methyl, ethyl, n-propyl, isopropyl, n-butyl, iso-butyl, sec-butyl, tert-butyl, n-pentyl, 2-methylbutyl, 2,2-dimethylpropyl, n-hexyl, 2-methylpentyl, 2,2-dimethylbutyl, n-heptyl, 3-heptyl, 2-methylhexyl, and the like. The terms "lower alkyl", "$C_1$-$C_4$ alkyl" and "alkyl of 1 to 4 carbon atoms" are synonymous and used interchangeably to mean methyl, ethyl, 1-propyl, isopropyl, cyclopropyl, 1-butyl, sec-butyl or t-butyl. As noted, the term alkyl includes both "unsubstituted alkyls" and "substituted alkyls," (i.e., optionally substituted unless the context clearly indicates otherwise) the latter of which refers to alkyl moieties having substituents replacing one or more hydrogens on one or more (often no more than four) carbon atoms of the hydrocarbon backbone and generally only one susbstituent on one or two carbon atoms. Such substituents are independently selected from the group consisting of: halo (e.g., I, Br, Cl, F), hydroxy, amino, cyano, alkoxy (such as $C_1$-$C_6$ alkoxy), aryloxy (such as phenoxy), nitro, carboxyl, oxo, carbamoyl, cycloalkyl, aryl (e.g., aralkyls or arylalkyls), heterocyclic, and heteroaryl. Exemplary substituted alkyl groups include hydroxymethyl, aminomethyl, carboxymethyl, carboxyethyl, carboxypropyl, acetyl (where the two hydrogen atoms on the —$CH_2$ portion of an ethyl group are replaced by an oxo ($=$O), methoxyethyl, and 3-hydroxypentyl. Particular substituted alkyls are substituted methyl groups. Examples of substituted methyl group include groups such as hydroxymethyl, acetoxymethyl, aminomethyl, carbamoyloxymethyl, chloromethyl, carboxymethyl, carboxyl (where the three hydrogen atoms on the methyl are replaced, two hydrogens are replaced by an oxo ($=$O) and the other hydrogen is replaced by a hydroxy (—OH), bromomethyl and iodomethyl.

"Alkenyl" when used alone or as part of another term means an optionally substituted unsaturated hydrocarbon group containing at least one carbon-carbon double bond, typically 1 or 2 carbon-carbon double bonds, and which may be linear or branched. Representative alkenyl groups include, by way of example, vinyl, allyl, isopropenyl, but-2-enyl, n-pent-2-enyl, and n-hex-2-enyl. As noted, the term alkenyl includes both "unsubstituted alkenyls" and "substituted alkenyls," (i.e., optionally substituted unless the context clearly indicates otherwise). The substituted versions refer to alkenyl moieties having substituents replacing one or more hydrogens on one or more (often no more than four) carbon atoms of the hydrocarbon backbone and generally only one susbstituent on one or two carbon atoms. Such substituents are independently selected from the group consisting of: halo (e.g., I, Br, Cl, F), hydroxy, amino, alkoxy (such as $C_1$-$C_6$ alkoxy), aryloxy (such as phenoxy), carboxyl, oxo, cyano, nitro, carbamoyl, cycloalkyl, aryl (e.g., aralkyls), heterocyclic, and heteroaryl.

Alkynyl when used alone or as part of another term means an optionally substituted unsaturated hydrocarbon group containing at least one carbon-carbon triple bond, typically 1 or 2 carbon-carbon triple bonds, and which may be linear or branched. Representative alkynyl groups include, by way of example, ethynyl; 1-, or 2-propynyl; 1-, 2-, or 3-butynyl, or 1,3-butdiynyl; 1-, 2-, 3-, 4-pentynyl, or 1,3-pentdiynyl; 1-, 2-, 3-, 4-, or 5-henynyl, or 1,3-hexdiynyl or 1,3,5-hextriynyl; 1-, 2-, 3-, 4-, 5- or 6-heptynyl, or 1,3-heptdiynyl, or 1,3,5-hepttriynyl; 1-, 2-, 3-, 4-, 5-, 6- or 7-octynyl, or 1,3-octdiynyl, and 1,3,5-octtriynyl. As noted, the term alkynyl includes both "unsubstituted alkynyl" and "substituted alkynyl," (i.e., optionally substituted unless the context clearly indicates otherwise). The substituted versions refer to alkynyl moieties having substituents replacing one or more hydrogens on one or more (often no more than four) carbon atoms of the hydrocarbon backbone and generally only one susbstituent on one or two carbon atoms. Such substituents are independently selected from the group consisting of: halo (e.g., I, Br, Cl, F), hydroxy, amino, alkoxy (such as $C_1$-$C_6$ alkoxy), aryloxy (such as phenoxy), carboxyl, oxo, cyano, nitro, carbamoyl, cycloalkyl, aryl (e.g., aralkyls), heterocyclic, and heteroaryl.

"Cycloalkyl" when used alone or as part of another term means an optionally substituted saturated or partially unsaturated cyclic aliphatic (i.e., non-aromatic) hydrocarbon group (carbocycle group), having up to 12 carbon atoms unless otherwise specified and includes cyclic and polycyclic, including fused cycloalkyl. As noted, the term cycloalkyl includes both "unsubstituted cycloalkyls" and "substituted cycloalkyls," (i.e., optionally substituted unless the context clearly indicates otherwise) the latter of which refers to cycloalkyl moieties having substituents replacing one or more hydrogens on one or more (often no more than four) carbon atoms of the hydrocarbon backbone and generally only one susbstituent on one or two carbon atoms. Such substituents are independently selected from the group consisting of: halo (e.g., I, Br, Cl, F), hydroxy, amino, alkoxy (such as $C_1$-$C_6$ alkoxy), aryloxy (such as phenoxy), carboxyl, oxo, cyano, nitro, carbamoyl, alkyl (including substituted alkyls), aryl, heterocyclic, and heteroaryl. Examples of cycloalkyls include cyclopropyl, cyclobutyl, cyclopentyl, cyclohexyl, tetrahydronaphthyl and indanyl.

"Aryl" when used alone or as part of another term means an optionally substituted aromatic carbocyclic group whether or not fused having the number of carbon atoms designated or if no number is designated, from 6 up to 14 carbon atoms. Particular aryl groups include phenyl, naphthyl, biphenyl, phenanthrenyl, naphthacenyl, and the like (see e. g. Lang's Handbook of Chemistry (Dean, J. A., ed) $13^{th}$ ed. Table 7-2 [1985]). Phenyl groups are generally preferred. As noted, the term aryl includes both "unsubstituted aryls" and "substituted aryls" (i.e., optionally substituted unless the context clearly indicates otherwise), the latter of which refers to aryl moieties having substituents replacing one or more hydrogens on one or more (usually no more than six) carbon atoms of the hydrocarbon core and generally only one susbstituent on one or two carbon atoms. Such substituents are independently selected from the group consisting of: halo (e.g., I, Br, Cl, F), hydroxy, amino, alkoxy (such as $C_1$-$C_6$ alkoxy), aryloxy (such as phenoxy), carboxyl, oxo, cyano, nitro, carbamoyl, alkyl, aryl, heterocyclic and heteroaryl. Examples of such substituted aryls, e.g., substituted phenyls include but are not limited to a mono- or di (halo) phenyl group such as 2-chlorophenyl, 2-bromophenyl, 4-chlorophenyl, 2,6-dichlorophenyl, 2,5-dichlorophenyl, 3,4-dichlorophenyl, 3-chlorophenyl, 3-bromophenyl, 4-bromophenyl, 3,4-dibromophenyl, 3-chloro-4-fluorophenyl, 2-fluorophenyl; a mono- or di (hydroxy) phenyl group such as 4-hydroxyphenyl, 3-hydroxyphenyl, 2,4-dihydroxyphenyl, a mono- or di (lower alkyl) phenyl group such as 4-methylphenyl, 2,4-dimethylphenyl, 2-methylphenyl, 4-(iso-propyl) phenyl, 4-ethylphenyl, 3-(n-propyl) phenyl; a mono or di (alkoxy) phenyl group, for example, 3,4-dimethoxyphenyl, 3-methoxy-4-benzyloxyphenyl, 3-methoxy-4-(1-chloromethyl) benzyloxy-phenyl, 3-ethoxyphenyl, 4-(isopropoxy) phenyl, 4-(t-butoxy) phenyl, 3-ethoxy-4-methoxyphenyl; 3- or 4-trifluoromethylphenyl; a mono- or dicarboxyphenyl or (protected carboxy) phenyl group such 4-carboxyphenyl; a mono- or di (hydroxymethyl) phenyl or 3,4-di (hydroxymethyl) phenyl; a mono- or di (aminomethyl) phenyl or 2-(aminomethyl) phenyl. The aryl groups may have amine functionality (amino) such that the amine reactant is a diaminobenzene or diaminobenzene sulfonic acid, diaminotoluene, diaminonaphthalene, diaminonaphthalene sulfonic acid, and numerous others.

"Heterocyclic group", "heterocyclic", "heterocycle", "heterocyclic", "heterocycloalkyl" or "heterocyclo" alone and when used as a moiety in a complex group, are used interchangeably and refer to any cycloalkyl group, i.e., mono-, bi-, or tricyclic, saturated or unsaturated, non-aromatic and optionally substituted hetero-atom-containing ring systems having the number of atoms designated, or if no number is specifically designated then from 5 to about 14 atoms, where the ring atoms are carbon and at least one heteroatom and usually not more than four (nitrogen, sulfur or oxygen). Included in the definition are any bicyclic groups where any of the above heterocyclic rings are fused to an aromatic ring (i.e., an aryl (e.g., benzene) or a heteroaryl ring). In a particular embodiment the group incorporates 1 to 4 heteroatoms. Typically, a 5-membered ring has 0 to 1 double bonds and 6- or 7-membered ring has 0 to 2 double bonds and the nitrogen or sulfur heteroatoms may optionally be oxidized (e. g. SO, $SO_2$), and any nitrogen heteroatom may optionally be quaternized. Particular non-aromatic heterocycles include morpholinyl (morpholino), pyrrolidinyl, oxiranyl, indolinyl, isoindolinyl, tetrahydroquinolinyl, tetrahydroisoquinolinyl, oxetanyl, tetrahydropyranyl, 2,3-dihydrofuranyl, 2H-pyranyl, tetrahydropyranyl, aziridinyl, azetidinyl, 1-methyl-2-pyrrolyl, piperazinyl and piperidinyl. As noted, the term heterocyclo includes both "unsubstituted heterocyclos" and "substituted heterocyclos" (i.e., optionally substituted unless the context clearly indicates otherwise), the latter of which refers to heterocyclo moieties having substituents replacing one or more hydrogens on one or more (usually no more than six) atoms of the heterocyclo core and generally only one susbstituent on one or two carbon atoms. Such substituents are independently selected from the group consisting of halo (e.g., I, Br, Cl, F), hydroxy, amino, alkoxy (such as $C_1$-$C_6$ alkoxy), aryloxy (such as phenoxy), carboxyl, oxo, cyano, nitro, carbamoyl, and alkyl.

"Heteroaryl" alone and when used as a moiety in a complex group refers to any aryl group, i.e., mono-, bi-, or tricyclic, optionally substituted aromatic ring system having the number of atoms designated, or if no number is specifically designated then at least one ring is a 5-, 6- or 7-membered ring and the total number of atoms is from 5 to about 14 and containing from one to four heteroatoms selected from the group consisting of nitrogen, oxygen, and sulfur (Lang's Handbook of Chemistry, supra). Included in the definition are any bicyclic groups where any of the above heteroaryl rings are fused to a benzene ring. The following ring systems are examples of the heteroaryl (whether substituted or unsubstituted) groups denoted by the term "heteroaryl": thienyl (alternatively called thiophenyl), furyl, imidazolyl, pyrazolyl, thiazolyl, isothiazolyl, oxazolyl, isoxazolyl, triazolyl, thiadiazolyl, oxadiazolyl, tetrazolyl, thiatriazolyl, oxatriazolyl, pyridyl, pyrimidyl, pyrazinyl, pyridazinyl, thiazinyl, oxazinyl, triazinyl, thiadiazinyl, oxadiazinyl, dithiazinyl, dioxazinyl, oxathiazinyl, tetrazinyl, thiatriazinyl, oxatriazinyl, dithiadiazinyl, imidazolinyl, dihydropyrimidyl, tetrahydropyrimidyl, tetrazolo[1,5-b]pyridazinyl and purinyl, as well as benzo-fused derivatives, for example benzoxazolyl, benzofuryl, benzothienyl, benzothiazolyl, benzothiadiazolyl, benzotriazolyl, benzoimidazolyl and indolyl. As noted, the term heteroaryl includes both "unsubstituted heteroaryls" and "substituted heteroaryls" (i.e., optionally substituted unless the context clearly indicates otherwise), the latter of which refers to heteroaryl moieties having substituents replacing one or more hydrogens on one or more (usually no more than six) atoms of the heteroaryl backbone. Such substituents are independently selected from the group consisting of: halo (e.g., I, Br, Cl, F), hydroxy, amino, alkoxy (such as $C_1$-$C_6$ alkoxy), aryloxy (such as phenoxy), carboxyl, oxo, cyano, nitro, carbamoyl, and alkyl.

"Amino" denotes primary (i.e., —$NH_2$), secondary (i.e., —NHR) and tertiary (i.e., —NRR) amine groups, where the R groups can be a variety of independently selected moieties, usually an alkyl or an aryl. Particular primary, secondary and tertiary amines are alkylamine groups, dialkylamine groups, arylamine groups, diarylamine groups, aralkylamine groups and diaralkylamine groups.

Suitable primary, secondary and polyamines amines for use as the amine reactant include, but are not limited to, methylamine, ethylamine, propylamine, isopropylamine, ethyl propylamine benzylamine dimethylamine, diethylamine, dipropylamine, caprylamine, palmitylamine, dodecylamine, heptylamine, stearylamine, ethylene diamine, diethylene triamine, triethylene tetraamine, tetraethylene pentamine, cadaverine, putrescine, spermine, spermidine, histamine, piperidine, ethanolamine, diethanolamine, aminoethylpiperazine, piperazine, morpholine, aniline, 1-naphthylamine, 2-napthylamine, para-aminophenol, diaminopropane, diaminodiphenylmethane, allylamine, cysteamine, aminoethylethanol amine, isopropanolamine, toluidine, Jeffamines, aminophenol, guanidine, aminothiourea, diaminoisophorone, diaminocyclohexane, dicyandiamide, amylamine, hexamethylenediamine, bis-hexamethylenediamine, polyvinylamine, polyallylamine, cyclohexylamine, xylylenediamine disopropylamine, aminoethylaminopropyltrimethoxysilane, aminopropyltriethoxysilane, aminoethylaminopropyltrimethoxysilane, aminoethylaminopropyltrimethoxysilane, aminoethylaminopropylsilane triol homopolymer, vinylbenzylaminoethylaminopropyltrimethoxysilane, aminopyridine, aminosalicylic acid, aminophenol, aminothiophenol, aminoresorcinol, bis(2-chloroethyl)amine, aminopropanediol, aminopiperidine, aminopropylphosphonic acid, amino(ethylsulfonyl) phenol, aminoethylmorpholine, aminoethylthiadiazole, aminoethyl hydrogen sulfate, aminopropylimidazole, aminoethylacrylate, polymerized aminoethylacrylate, aminoethylmethacrylate, polymerized aminoethylmethacrylate, the condensation polymers and oligomers of diacids and polyacids with triamines and higher polyamines like diethylene triamine and triethylene tetraamine.

Still other amine reactants include furfurylamine, dipropylene triamine (available from Air Products), tripropylene tetramine (available from Air Products), tetrapropylene pentamine (available from Air Products), the reaction products of amines with formaldehyde including hexamethylene tetraamine, N,N,N-tri(hydroxyethyl)triazine, triazone, low molecular weight amino esters like aminoethylacetate, aminopropylacetate, aminoethylformate, aminopropylformate, aminoethylproprionate, aminopropylproprionate, aminoethylbutyrate, aminopropylbutyrate, aminoethylmaleate, di(aminoethylmaleate), fatty aminoesters like aminoethyltallate, the aminopropyl ester of all fatty acids, fatty acid dimers, oxidized fatty acids, maleated fatty acid, and oxidized-maleated fatty acids, and the aminoethyl ester of all fatty acids, fatty acid dimers, oxidized fatty acids, maleated fatty acid, and oxidized-maleated fatty acids—particularly when the fatty acid is tall oil fatty acid (TOFA). Polyamino esters like the polymer of aminoethylacrylate, the polymer of amino ethylmethacrylate, the polymer of aminopropylacrylate, the polymer of aminopropylmethacrylate, and all other polycarboxylic acids that have been exhaustively esterfied with ethanolamine (done under acid conditions to selectively form the ester over the amide).

Also contemplated as amine reactants for the Maillard reaction are amido amine reactions products having residual reactive amino groups of a diamine or polyamine with a carboxylic acid or a mixture of carboxylic acids such as rosin acid, maleated rosin, maleated unsaturated fatty acids, oxidized unsaturated fatty acids, oxidized maleated unsaturated fatty acids, unsaturated fatty acid dimers and trimers, particularly when the fatty acid is TOFA.

Suitable amine reactants for use in producing a Maillard reaction product by a Maillard reaction in accordance with the present invention also include both natural and synthetic amino acids, i.e., compounds having both reactive amino and acid (carboxyl) functional groups.

Suitable amino acids thus would include biogenic amino acids such as alanine, aminobutyric acid, arginine, asparagine, aspartic acid, cysteine, cystine, dibromotyrosine, diiodotyrosine, glutamic acid, glutamine, histidine, homocysteine, hydroxylysine, hydroxyproline, isoleucine, leucine, lysine, methionine, ornithine, phenylalanine, proline, sarcosine, serine, threonine, thyroxine, tryptophane, tyrosine, and valine, and all potential dimers, oligimers and polymers made from such amino acids. Synthetic amino acids including aminobenzoic acid, aminosalicylic acid, aminoundecanoic acid and all potential dimers, oligomers and polymers made from them are likewise suitable raw materials (amine reactants) for producing a Maillard reaction product by the Maillard reaction. Higher molecular weight amine reactants include peptides and proteins including gluten, whey, glutathione, hemoglobin, soy protein, collagen, pepsin, keratin, and casein as these materials can also participate in the Maillard reaction.

Other suitable synthetic amino acid-type amine reactants can be formed by reacting a polyamine with a polycarboxylic acid or a mixture of polycarboxylic acids. The reaction between the polyamine and the acid can be performed prior to, or coincident with the Maillard reaction.

Suitable polycarboxylic acids for forming a synthetic amino acid-type amine reactant by reaction with a polyamine include, but are not limited to monomeric polycarboxylic acids and/or a polymeric polycarboxylic acids. Such polycarboxylic acids include dicarboxylic acids, tricarboxylic acids, tetracarboxylic acids, pentacarboxylic acids, and higher carboxyl functionality. Certain polycarboxylic acids also may be used in their anhydride form.

To illustrate, but not to limit the potential monomeric polycarboxylic acids that can be used, mention can be made of the following: unsaturated aliphatic acids, saturated aliphatic acids, aromatic acids, unsaturated carbocyclic acids, and saturated carbocyclic acids, all of which might be optionally substituted, with hydroxy, halo, alkyl, and alkoxy groups. Representative monomeric polycarboxylic acids thus include, but should not be limited to citric acid, aconitic acid, adipic acid, azelaic acid, butane tetracarboxylic acid dihydride, butane tricarboxylic acid, chlorendic acid, citraconic acid, dicyclopentadiene-maleic acid adducts, diethylenetriamine pentaacetic acid, adducts of dipentene and maleic acid, adducts of olefins and maleic acids, ethylenediamine tetraacetic acid (EDTA), maleated rosin, maleated, unsaturated fatty acids including maleated tall oil fatty acid, oxdized unsaturated fatty acids including oxidized tall oil fatty acid, oxidized maleated unsaturated fatty acids including oxidized and maleated tall oil fatty acid, unsaturated fatty acid dimer and trimers (including TOFA dimers and trimers), fumaric acid, glutaric acid, isophthalic acid, itaconic acid, maleated rosin oxidized with potassium peroxide to alcohol then carboxylic acid, maleic acid, malic acid, mesaconic acid, biphenol A or bisphenol F reacted via the KOLBE-Schmidt reaction with carbon dioxide to introduce 3-4 carboxyl groups, oxalic acid, phthalic acid, sebacic acid, succinic acid, tartaric acid, terephthalic acid, tetrabromophthalic acid, tetrachlorophthalic acid, tetrahydrophthalic acid, trimellitic acid, polyacrylic acid, polymethacrylic acid, polyaspartic acid, aspartic acid, ascorbic acid, glucaric acid, styrene maleic acid copolymers, styrene fumaric acid copolymers, polyitaconic acid, adipic acid, glutamic acid, malonic acid, malic acid, polycrotonic acid, humic acid, sorbic acid, and trimesic acid.

Possible polymeric polycarboxylic acids can be equally expansive and can include homopolymers and/or copolymers prepared from unsaturated carboxylic acids including, but not necessarily limited to, acrylic acid, methacrylic acid, crotonic acid, isocrotonic acid, maleic acid, cinnamic acid, 2-methylmaleic acid, itaconic acid, 2-methylitaconic acid and $\alpha,\beta$-methyleneglutaric acid. Suitable polymeric polycarboxylic acids also may be prepared from unsaturated anhydrides including, but not necessarily limited to, maleic anhydride, itaconic anhydride, acrylic anhydride, and methacrylic anhydride. Non-carboxylic vinyl monomers, such as styrene, $\alpha$-methylstyrene, acrylonitrile, methacrylonitrile, methyl acrylate, ethyl acrylate, n-butyl acrylate, isobutyl acrylate, methyl methacrylate, n-butyl methacrylate, isobutyl methacrylate, glycidyl methacrylate, vinyl methyl ether and vinyl acetate, also may be copolymerized with above-noted carboxylic acid monomers to form suitable polymeric polycarboxylic acids. Methods for polymerizing these monomers are well-known in the chemical art.

Suitable polymeric polycarboxylic acids also can include certain polyester adducts of a polycarboxylic acid, such as those mentioned above, and a polyol. Suitable polyols can include, but are not limited, for example, to ethylene glycol, glycerol, pentaerythritol, trimethylol propane, sorbitol, sucrose, glucose, resorcinol, catechol, pyrogallol, glycollated ureas, 1,4-cyclohexane diol, diethanolamine, triethanolamine, bis[N,N-di($\beta$-hydroxyethyl)]adipamide, bis[N,N-di($\beta$-hydroxypropyl)]azelatnide, bis[N,N-di($\beta$-hydroxypropyl)]adipamide, bis[N,N-di($\beta$-hydroxypropyl)]glutaramide, bis[N,N-di($\beta$-hydroxypropyl)]succinamide, bis[N-methyl-N-($\beta$-hydroxyethyl)]oxamide, polyvinyl alcohol, a partially hydrolyzed polyvinyl acetate, and homopolymers or copolymers of hydroxyethyl (meth)acrylate, and hydroxypropyl (meth)acrylate. The polyester adduct must contain at least two carboxylic acid groups or anhydride or salt equivalents thereof. Methods for making such polyesters are well-known Another category of suitable amine reactants are adducts of ammonia (typically supplied as an aqueous solution), primary amines, and/or secondary amines pre-reacted (or reacted in situ) with monomeric polycarboxylic acids and/or polymeric polycarboxylic acids to produce the respective ammonium salts of the acid or mixture of acids. While ammonia can conveniently be used, any reactive amine, including any primary or secondary amine suitable for reacting with monomeric polycarboxylic acid and/or a polymeric polycarboxylic acid also could be used.

Thus, ammonium salts produced by neutralizing polycarboxylic acid(s)s with ammonia, or with a primary or secondary amine including those ammonium salts produced by a less-than-complete neutralization are considered suitable for use as an amine reactant for making a Maillard reaction product to be used in carrying out a process in accordance with the present invention. In such instances, the neutralization of the acid groups of the polycarboxylic acid(s) also can be carried out either before or after the reducing sugar, or equivalent thereof is added for forming the Maillard reaction product.

The reducing sugar or equivalent thereof for forming the Maillard reaction product include carbohydrates having, or capable of generating a reducing sugar during the formation of the Maillard reaction product. A reducing sugar is a carbohydrate that either contains an aldehyde group, or can isomerize, i.e., tautomerize, to contain an aldehyde group, which is reactive with an amine e.g. a compound having an amino group under Maillard reaction conditions. Generally, such aldehyde groups can be oxidized with $Cu^{42}$ to afford carboxylic acids. Suitable reducing sugars or their equivalents may optionally be substituted with hydroxy, halo, alkyl, and alkoxy groups. It is common for such compounds to have one or more chiral centers, and in those circumstances any of the optical isomers can be used, including racemic mixtures, or other diastereomeric mixtures of the various optical isomers. Suitable reducing sugars or their equivalents thus include monosaccharides in the aldose or ketose form, including a triose, a tetrose, a pentose, a hexose, or a heptose such as glyceraldehyde, dihydroxyacetone, erythrose, threose, erythrulose, ribose, arabinose, xylose, lyxose; ribulose, arabulose, xylulose, lyxulose, glucose (i.e., dextrose), mannose, galactose, allose, altrose, talose, gulose, idose; fructose, psicose, dendroketose, aldotetrose, aldopentose, aldohexose, sorbose, tagatose and sedoheptulose; a polysaccharide such as sucrose, lactose, maltose, starch, and cellulose, or a combination thereof.

In particular, suitable reducing sugars or reducing sugar equivalents for use in a Maillard reaction for making a Maillard reaction product include dextrose, fructose, high fructose corn syrup, dihydroxyacetone, erythrulose, ribulose, xylulose, psicose, sorbose, tagatose, glyceraldehyde, erythrose, threose, ribose, arabinose, xylose, allose, altrose, mannose, gulose, galactose, talose, maltose, cellobiose, lactose, and gentiobiose. Other reducing sugar equivalents like furfural, pyruvaldehyde, acetaldehyde, crotonaldehyde, 2-furaldehyde, quinine ascorbic acid, glycolaldehyde, glycolaldehyde dimer, trans-3-(2-furyl) acrolein, acrolein, 2,5-di(hydroxymethyl)furan, furfurol, 5-hydroxymethylfurfural, 5-methylfurfurol, 5-methylfurfural, 4-hydroxycrotonaldehyde, cinnamaldehyde and combinations thereof are also suitable as raw materials for the Maillard reaction.

The current thinking is that molecules produced by a Maillard reaction likely include a general structure comprising a backbone of carbon atoms with an occasional nitrogen atom, possibly long stretches of conjugated double bonds, and possibly highly hydrophilic side chains due to hydroxy groups being substituted on many of the carbon atoms (See "Isolation and Identification of Nonvolatile. Water Soluble Maillard Reaction Products," Thesis, Eva Kaminski, McGill University 1997). At least some nitrogen atoms are thought to be double bonded to one carbon in the backbone and the existence of carbon side chains substituted on some of the nitrogen atoms makes some of the nitrogen atoms quaternary, thus often introducing some cationic character to the molecules.

Melanoidins typically display an atomic C:N ratio, degree of unsaturation, and chemical aromaticity that increase with temperature and time of heating. (See, Ames, J. M. in "The Maillard Browning Reaction—an update," Chemistry and Industry (Great Britain), 1988, 7, 558-561, the disclosure of which is hereby incorporated herein by reference). Accordingly, Maillard reaction products used in connection with the various applications contemplated by the present invention, including certain separation processes, may contain melanoidins, or other Maillard reaction products consistent with these understandings.

The present invention also contemplates the addition of a non-carbohydrate polyhydroxy reactant along with the reducing sugar or equivalent when preparing the Mallard reaction product. Non-limiting examples of non-carbohydrate polyhydroxy reactants for optional use in combination with the reducing sugar or equivalent for making the Maillard reaction product are trimethylolpropane, glycerol, pentaerythritol, partially hydrolyzed polyvinyl acetate, fully hydrolyzed polyvinyl acetate (i.e., polyvinyl alcohol), and mixtures thereof.

The preparation of suitable Maillard reaction products is easily accomplished by mixing (1) an amine reactant and (2) a reducing sugar or a reducing sugar equivalent, or a mixture thereof under conditions conducive for a Maillard reaction. The reaction can be conducted in an aqueous medium and generally proceeds under a range of pH conditions, though an acidic pH is most commonly employed. Depending on the specific reactants chosen, the reaction may proceed under ambient conditions, or may require mild heating to initiate the reaction. Conducting the reaction in an aqueous medium under refluxing conditions has proven to be suitable. Generally, the reaction is sufficiently exothermic that once initiated, it may not be necessary to supply any additional heating such that the reaction system becomes self-refluxing.

While the relative quantities of (1) an amine reactant and (2) a reducing sugar or a reducing sugar equivalent, or a mixture thereof for preparing the Maillard reaction product can be varied depending on particular circumstances, for the most part preparing the Maillard reaction product at a relative ratio of the moles of the reducing sugar (or reducing sugar equivalent) to moles of amine functional groups (reactive amino groups) in the amine reactant within the range of 1:1 to 3:1 should be suitable.

Thus, in one embodiment, the reactant mixture for preparing a Maillard reaction product may comprise an aqueous mixture of an amine reactant, such as ammonia, a polycarboxylic acid, i.e., citric acid, and a reducing sugar, i.e., dextrose provided in a molar ratio of moles ammonia:moles citric acid:moles dextrose of 3.3:1:6. In this case, a slight excess amount of ammonia (about 10%) designed to completely neutralize the citric acid is provided. Nonetheless, the volatility of the ammonia may prevent full or complete neutralization of the citric acid during the formation of the Maillard reaction product.

When producing a Maillard reaction product for certain deicing or anti-icing applications, it is may be useful to control the extent of the Maillard reaction that occurs. On the one hand, a simple physical mixture (e.g., an aqueous solution) of the amine reactant and the reducing sugar or equivalent may not be an effective freeze conditioner composition. On the other hand, if the reaction leading to the Maillard reaction product is allowed to go to dryness, a highly water insoluble, hard, thermoset material may be formed in some instances. Even if the resulting solid is comminuted into small particles in such cases, the material may not be an effective freeze conditioner composition. Thus, in some cases the reaction might need to be controlled to reach a point where the solution or mixture of the reactants and/or products becomes viscous but still retains some water solubility, miscibility and/or remains dispersible in water. The ability of the Maillard reaction product to function as a freeze conditioner composition thus may vary as a function of its molecular weight, up to a point where solubility, miscibility, or dispersibility becomes an issue.

The exact desired end point of the reaction forming a Maillard reaction product will vary depending on its intended end use and is influenced by a variety of factors, such as the particular reactants chosen, the reactant concentrations, the reaction temperature, pH, time, etc. A skilled worker, armed with the disclosure of this application, through the exercise of only routine testing will be able to identify a suitable set of conditions for producing a suitable Maillard reaction product to be used as a freeze conditioner for a particular application. Applicants have observed that in the case of a Maillard reaction product made from aqueous ammonia, citric acid and dextrose, heating the aqueous mixture to atmospheric reflux, removing the heat and then allowing it to cool to room (ambient) temperature has resulted in a suitable Maillard reaction product for use in the present invention. The resulting Maillard reaction product can be used as an aqueous solution or dispersion and some forms can be dried (e.g. such as by spray drying) to form a solid product.

The pH of the Maillard reaction product in an aqueous medium may vary from acidic, i.e., a pH less than 7, for example between 2 and 6, to an alkaline pH, i.e., a pH greater than 7, for example between 8 and 12, depending on the specific types and amounts of the various reactants. The present invention contemplates neutralizing, i.e., forming a salt of such acidic and alkaline Maillard reaction products using an appropriate base or acid depending on the pH of the reaction product. Such neutralized products also are contemplated for use as a freeze conditioner in accordance with various aspects of the present invention. Thus, in the case of an acidic reaction product, a base, such as an alkali or alkaline earth metal hydroxide, (e.g., sodium or potassium hydroxide), an amine (e.g., a primary, secondary or tertiary amine such as guanidine), ammonia or some other organic or inorganic base, may be added to the Maillard reaction product. Alternatively, in the case of a alkaline reaction product, an acid, such as an inorganic acid (e.g., hydrochloric acid or sulfuric acid) or an organic acid (e.g., acetic acid or formic acid), may be added to the Maillard reaction product to form the neutralized salt.

In any event, the present invention is not limited to the use of any particular process for making a Maillard reaction product and it is contemplated that any formulation containing at least 1 weight percent of a Maillard reaction product, prepared by a reaction between (1) an amine reactant and (2) a reducing sugar, a reducing sugar equivalent, or a mixture thereof, should be suitable for preparing a freezing conditioner composition useful in accordance with certain aspects of the method of the present invention.

Depending upon any particular de-icing or anti-icing application, the aforementioned Maillard reaction product-containing compositions may be used directly without any modification as a freeze conditioner composition in the practice of the present invention. Alternatively, converting the so-described Maillard reaction product-containing formulations into a freeze conditioner composition may be as simple as diluting the reaction products with additional water to lower the content of the Maillard reaction product to the desired target for the particular deicing or anti-icing application.

As is the case with the urea-formaldehyde freeze conditioner described above, the amount of Maillard reaction product-containing freeze conditioner composition to apply to a surface to be treated also depends upon the particular application and the anticipated moisture content. For example, when used for treating particulate solids, such as grains, coal or coke, for inhibiting agglomeration under freezing conditions, where the moisture content of such solids is expected to be above 5% by weight and often in the range of about 5 to 20% by weight, it is contemplated that an amount of the composition should be applied such that at least about 0.001 part by weight to 0.05 part by weight of the freeze conditioner per part by weight of the particulate material to be freeze conditioned, usually from 0.0025 part by weight to 0.025 part by weight of the freeze conditioner per part by weight, and possibly from 0.003 to 0.01 of the particulate material to be freeze conditioned is applied. For other applications, such as for deicing roads, or for deicing, or anti-icing other outdoor surfaces, such as for deicing airplanes, the Maillard reaction product-containing freeze conditioner composition should be applied such that at least about 1 and up to about 35 pounds, often from about 2 up to about 25 pounds, also from about 3 up to about 16 pounds of Maillard reaction product composition is deposited over each 100 square feet of surface to be treated for deicing or anti-icing. A suitable application rate for other potential uses of the Maillard reaction product freeze conditioner composition, such as to inhibit or prevent ice formation on plants, on fruits and on vegetables can be determined by an ordinary skilled worker using only routine experimentation.

It is also contemplated that the Maillard reaction product-containing composition could be augmented with or could be used to augment other components that have historically been used in deicing and anti-icing compositions such as inorganic salts, ethylene glycol, diethylene glycol, propylene glycol, glycerol, acetate salts, formate salts, alcohols, sugars, including molasses, borate salts, urea, surfactants, and the like.

To reduce the salt out temperature of (1) liquid fertilizers, such as aqueous solutions of urea, ammonium nitrate, calcium nitrate, magnesium nitrate, calcium ammonium nitrate, diammonium phosphate, dipotassium phosphate, disodium phosphate, ammonium potassium phosphate, ammonium sodium phosphate, ammonium sulfate, potassium sulfate, ammonium potassium sulfate, ammonium sodium sulfate, potassium sodium sulfate and mixtures thereof, or (2) deicing solutions, such as such as aqueous solutions of ammonium formate, sodium formate, potassium formate, ammonium chloride, sodium chloride, potassium chloride, calcium chloride, magnesium chloride, ammonium acetate, sodium acetate, potassium acetate, calcium magnesium acetate, boric acid, borate salts; sugars like sorbitol, molasses solids and sugar beet derivatives; and other simple organics like urea and mixtures thereof, an amount of Maillard reaction product-containing freeze conditioner composition is added to the liquid fertilizer or to the deicing solution so as to provide at least 2 and up to 50 percent by weight, alternatively at least 5 percent by weight, alternatively at least 10 percent by weight up to 50 percent by weight, alternatively up to 40 percent by weight, alternatively up to 30 percent by weight, Maillard reaction product in the liquid fertilizer or deicing solution.

Use of Maillard reaction product to reduce the salt out temperature of liquid fertilizer solutions, including mixtures with aqueous nitrates such as with UAN (28-0-0), UAN (30-0-0), UAN (32-0-0), calcium ammonium nitrate (CAN-17), calcium nitrate, and magnesium nitrate, are particularly contemplated.

In carrying out the deicing and anti-icing method of the present invention, the freeze conditioner is applied, such as by dipping, spraying, brushing or injecting for liquid compositions, or by spreading for solid forms, onto the surface desired to be treated. In the case of deicing applications, the surface will already have ice that has formed thereon and the freeze conditioner acts to reduce the accumulation of additional ice and also acts to melt or disrupt the ice that has already formed. In the case of anti-icing, pretreatment of surfaces, the freeze conditioner will inhibit or interfere with, and may thereby prevent, ice formation on the treated surface.

In accordance with the method of the present invention, the respective freeze conditioner can be spread onto outdoor surfaces, such as road surfaces, sidewalks, parking lots and the like in a dried particulate form, they can be sprayed on as a single or as multiple solutions or they can be mixed with other adjuvants, such as a non-slipping agent (e.g., sand), before application.

As noted above, the present invention also is directed to a method for deicing aircraft in which an aqueous solution of a freeze conditioner is sprayed onto the surface of the aircraft, usually onto the wings, fuselage and tail of the aircraft.

When used for salt out temperature reduction, the freeze condition composition is simply mixed into the solution for which such salt out protection is sought.

As used herein, the phrase "water soluble" indicates that a sufficient quantity of the respective freeze conditioner may be dissolved in water so that the presence of the freeze conditioner in the water affects, i.e., degrades, the strength and integrity of any ice formed when the water freezes, or reduces the temperature at which other dissolved species salt out.

In further embodiments, the present invention is:

1. A method for inhibiting the formation or accumulation of ice on a surface which comprises treating the surface with a freeze conditioner selected from the group consisting of (1) urea-formaldehyde, particularly including those containing triazone(s) (2) sulfonated melamine-formaldehyde, (3) methylated melamine-formaldehyde, (4) sulfonated urea-formaldehyde, (5) sulfonated urea-melamine formaldehyde, (6) Maillard reaction products of an amine reactant and a reducing sugar, a reducing sugar equivalent, or a mixture thereof, and (7) their blends.

2. A method of treating moist particulate solids to inhibit formation of a coherent mass of the particulate solids under freezing conditions which comprises applying a freeze conditioner selected from the group consisting of (1) urea-formaldehyde, particularly including those containing triazone(s) (2) sulfonated melamine-formaldehyde, (3) methylated melamine-formaldehyde, (4) sulfonated urea-formaldehyde, (5) sulfonated urea-melamine formaldehyde, (6) Maillard reaction products of an amine reactant and a reducing sugar, a reducing sugar equivalent, or a mixture thereof, and (7) their blends to the moist particulate solids.

3. A method for treating outdoor surfaces to interfere with the formation or accumulation of ice on the surface which comprises applying to the surface a freeze conditioner selected from the group consisting of (1) urea-formaldehyde, particularly including those containing triazone(s) (2) sulfonated melamine-formaldehyde, (3) methylated melamine-formaldehyde, (4) sulfonated urea-formaldehyde, (5) sulfonated urea-melamine formaldehyde, (6) Maillard reaction products of an amine reactant and a reducing sugar, a reducing sugar equivalent, or a mixture thereof, and (7) their blends.

4. A method for deicing aircraft which comprises spraying an aqueous solution of a freeze conditioner selected from the group consisting of (1) urea-formaldehyde, particularly including those containing triazone(s) (2) sulfonated melamine-formaldehyde, (3) methylated melamine-formaldehyde, (4) sulfonated urea-formaldehyde, (5) sulfonated urea-melamine formaldehyde, (6) Maillard reaction products of an amine reactant and a reducing sugar, a reducing sugar equivalent, or a mixture thereof, and (7) their blends onto the surface of the aircraft.

5. A method for reducing the salt out temperature of a liquid ammonium nitrate fertilizer which comprises adding to the liquid fertilizer an aqueous solution of a freeze conditioner selected from the group consisting of (1) urea-formaldehyde, particularly including those containing triazone(s) (2) sulfonated melamine-formaldehyde, (3) methylated melamine-formaldehyde, (4) sulfonated urea-formaldehyde, (5) sulfonated urea-melamine formaldehyde, (6) Maillard reaction products of an amine reactant and a reducing sugar, a reducing sugar equivalent, or a mixture thereof, and (7) their blends.

6. A method for reducing the salt out temperature of a liquid fertilizer which comprises adding to the liquid fertilizer an aqueous solution of a freeze conditioner selected from the group consisting of (1) urea-formaldehyde, particularly including those containing triazone(s) (2) sulfonated melamine-formaldehyde, (3) methylated melamine-formaldehyde, (4) sulfonated urea-formaldehyde, (5) sulfonated urea-melamine formaldehyde, (6) Maillard reaction products of an amine reactant and a reducing sugar, a reducing sugar equivalent, or a mixture thereof, and (7) their blends.

7. A method for reducing the salt out temperature of a liquid which comprises adding to the liquid an aqueous solution of a freeze conditioner selected from the group consisting of (1) urea-formaldehyde, particularly including those containing triazone(s) (2) sulfonated melamine-formaldehyde, (3) methylated melamine-formaldehyde, (4) sulfonated urea-formaldehyde, (5) sulfonated urea-melamine formaldehyde, (6) Maillard reaction products of an amine reactant and a reducing sugar, a reducing sugar equivalent, or a mixture thereof, and (7) their blends.

8. A method for reducing the salt out temperature of a deicing solution which comprises adding to the deicing solution an aqueous solution of a freeze conditioner selected from the group consisting of (1) urea-formaldehyde, (2) sulfonated melamine-formaldehyde, (3) methylated melamine-formaldehyde, (4) sulfonated urea-formaldehyde, (5) sulfonated urea-melamine formaldehyde, (6) Maillard reaction products of an amine reactant and a reducing sugar, a reducing sugar equivalent, or a mixture thereof, and (7) their blends.

9. A method of treating moist particulate combustible solids to inhibit formation of a coherent mass of the particulate solids under freezing conditions and to inhibit the potential of the solids to combust prematurely which comprises applying a freeze conditioner selected from the group consisting of (1) urea-formaldehyde, particularly including those containing triazone(s) (2) sulfonated melamine-formaldehyde, (3) methylated melamine-formaldehyde, (4) sulfonated urea-formaldehyde, (5) sulfonated urea-melamine formaldehyde, (6) Maillard reaction products of an amine reactant and a reducing sugar, a reducing sugar equivalent, or a mixture thereof, and (7) their blends to the moist particulate combustible solids.

10. A method according to any of the previous embodiments wherein said urea-formaldehyde comprises an aqueous urea-formaldehyde solution containing triazone.

11. A method according to any of the previous embodiments wherein said sulfonated melamine-formaldehyde comprises an aqueous sulfonated melamine-formaldehyde solution.

12. A method according to any of the previous embodiments wherein said sulfonated melamine-urea-formaldehyde comprises an aqueous sulfonated melamine-urea-formaldehyde solution.

13. A method according to any of the previous embodiments wherein said methylated melamine-formaldehyde comprises an aqueous methylated melamine-formaldehyde solution.

14. A method according to any of the previous embodiments wherein said sulfonated urea-formaldehyde comprises an aqueous sulfonated urea-formaldehyde solution.

15. A method according to any of the previous embodiments wherein said Maillard reaction products of an amine reactant and a reducing sugar, a reducing sugar equivalent, or a mixture thereof comprises an aqueous solution of Maillard reaction products.

The following examples provide illustrative embodiments of the present invention and are not intended as a limitation on the scope of the invention. Unless otherwise indicated, all parts and percentages are by weight.

Example 1

The following example illustrates the freezing point depression effect of aqueous triazone-containing urea-formaldehyde solutions:

| Georgia-Pacific Product Number | Description | Freeze Point (° C.) |
| --- | --- | --- |
| 725G12 | F/U = 0.8; F/A = 4.0 | −37° C. |
| 725G13 | F/U = 0.8; F/A = 3.0 | −35° C. |
| 725G14 | F/U = 1.0; F/A = 3.5 | −35° C. |
| 725G17 | F/U = 1.2; F/A = 4.0 | −40° C. |
| 726G14 | F/U = 1.2; F/A = 3.0 | −42° C. |

F/U is the formaldehyde to urea mole ratio, F/A is the formaldehyde to ammonia mole ratio of the urea-formaldehyde product.

Example 2

The following compositions illustrate the effect, on salt out temperature, which the addition of a triazone containing urea-formaldehyde has on liquid fertilizers, particularly the two most commonly used commercial liquid fertilizers UAN (28-0-0) and UAN (32-0-0).

UAN (28-0-0)
　Salt out temp: 14° F.
　* salt out occurs within 48 hrs at 3° F. *
UAN (32-0-0)
　Salt out temp: 32° F.
　* salt out occurs within 48 hrs at 3° F. *
100% triazone-containing U-F (25-0-0)
　Salt out temp: <−40° F.
　Freeze Point: −40° F.
70% UAN-32/30% triazone-containing U-F (30-0-0)
　Salt out temp: −24° F.
　Freeze Point: −40° F.

\*\*\* storage stable at 3° F. for greater than 120 days\*\*\*
50% UAN-32/50% triazone-containing U-F (29-0-0)
  Salt out temp: −16° F.
  Freeze Point: −35° F.

Example 3

Preparation of a Maillard reaction product for use as a freeze conditioner

A Maillard-like reaction product was prepared according to the following procedure: 1081 grams of anhydrous dextrose, 194.5 grams of anhydrous citric acid, and 183.8 grams of 28% aqua ammonia were combined in a reaction vessel and then heated while being stirred to a target of temperature 85° C. Heating was terminated when the mixture attained 85° C., but the exothermic reaction carried the temperature further to nearly 105° C., before the reaction mixture started to cool. No vacuum was applied to the vessel during the reaction. The final mixture was a dark-brown syrup, the solids were measured to be 65% using a microwave CEM set to a maximum temperature of 135° C. The specific gravity is 1.3.

Example 4

Titration of the Maillard produced in Example 1 reaction product 12.3 grams of the dark-brown syrup produced in Example 3 was diluted in 98.8 grams of water, where it exhibited a pH of 3.70. A 0.2 N NaOH solution was added to the solution with intermittent pH testing with a pH probe, 120 ml of the NaOH solution was needed to neutralize the 12.3 grams and yield a solution having a pH of 8.5. Adding above this amount of NaOH solution, the pH would be initially high, but then would fall over time to a pH of ~9. To neutralize the solution of the Maillard reaction product with ammonia to the same degree as was done with 120 ml of NaOH on 12.3 g of syrup, would require about 11.85 grains of 28% aqua ammonia to 100 g of syrup.

Example 5

Neutralization of the Maillard reaction product with aqua ammonia

To 468.6 g of the Maillard reaction product of Example 3 was added 56 grams of 28% aqua ammonia. The resulting pH was 6.72. The final solids tested at 65% using a microwave CEM set to a maximum temperature of 135° C. The specific gravity is 1.3.

Example 6

Neutralization of the Maillard reaction product with guanidine carbonate 71.9 grams of guanidine carbonate was added to 410.2 grams of the Maillard reaction product of Example 3. The mixture swelled, and 200 ml of water was added in two 100 ml aliquots in order to depress the foam. The resulting mixture had a pH of 6.08 and a solids content of 53% using a microwave CEM set to a maximum temperature of 135° C. The specific gravity is 1.22.

Example 7

Preparation of a Maillard reaction product of dextrose and lysine for use as freeze conditioner A Maillard reaction product was prepared according to the following procedure:
720.56 grams of anhydrous dextrose, 183.67 grams of lysine HCl, 68.3 grams of 28% aqua ammonia, and 392 grams of water were combined in a reaction vessel and then heated while being stirred to a target temperature of 85° C. Heating was terminated when the mixture attained 85° C., but the exothermic reaction carried the temperature further to nearly 105° C., before the reaction mixture started to cool. Vacuum was applied to the vessel to facilitate cooling. The final mixture was a dark-brown syrup, the solids were measured to be 62% by weight using a microwave CEM set to a maximum temperature of 135° C. The specific gravity is 1.32.

Example 8

Preparation of a Maillard reaction product of dextrose and betaine for use as a freeze conditioner A Maillard reaction product was prepared according to the following procedure:
1080 grams of anhydrous dextrose, 460 grams of betaine HCl, and 200 grams of 28% aqua ammonia were combined in a reaction vessel and then heated while being stirred to a target temperature of 85° C. Heating was terminated when the mixture attained 85° C., but the exothermic reaction carried the temperature further to nearly 105° C., before the reaction mixture started to cool. Vacuum was applied to the vessel to facilitate cooling. The final mixture was a dark-brown syrup, the solids were measured to be 61% by weight using a microwave CEM set to a maximum temperature of 135 C. The specific gravity is 1.23.

The present invention has been described with reference to specific embodiments. However, this application is intended to cover those changes and substitutions that may be made by those skilled in the art without departing from the spirit and the scope of the invention. Unless otherwise specifically indicated, all percentages are by weight. Throughout the specification and in the claims the term "about" is intended to encompass + or −5% and preferably is only about + or −2%.

We claim:

1. A method for inhibiting the formation or accumulation of ice on a surface which comprises treating the surface with a freeze conditioner selected from the group consisting of (1) sulfonated melamine-formaldehyde, (2) methylated melamine-formaldehyde, (3) sulfonated urea-formaldehyde, (4) sulfonated urea-melamine formaldehyde, or a mixture thereof, and (5) their blends.

2. The method of claim 1 wherein said freeze conditioner comprises an aqueous solution.

3. A method for inhibiting the formation or accumulation of ice on a surface which comprises treating the surface with a freeze conditioner selected from an aqueous urea-formaldehyde solution containing triazone.

\* \* \* \* \*